US007591864B2

(12) United States Patent
Linkous et al.

(10) Patent No.: US 7,591,864 B2
(45) Date of Patent: Sep. 22, 2009

(54) CATALYSTS FOR THE EVOLUTION OF HYDROGEN FROM BOROHYDRIDE SOLUTION

(75) Inventors: Clovis Alan Linkous, Merritt Island, FL (US); Darlene Kay Slattery, Cocoa, FL (US); Danielle Delong Nangle, Stewart, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 698 days.

(21) Appl. No.: 11/031,233

(22) Filed: Jan. 7, 2005

(65) Prior Publication Data
US 2005/0158596 A1 Jul. 21, 2005

Related U.S. Application Data

(60) Provisional application No. 60/535,293, filed on Jan. 9, 2004.

(51) Int. Cl.
*C01B 3/02* (2006.01)
*B01J 7/00* (2006.01)
(52) U.S. Cl. ............... 48/61; 423/648.1; 423/658.2
(58) Field of Classification Search .......... 423/651, 423/648.1, 658.2; 502/102; 48/61
See application file for complete search history.

(56) References Cited

U.S. PATENT DOCUMENTS

| | | | | |
|---|---|---|---|---|
| 3,459,510 A | * | 8/1969 | Litz et al. ............... 422/113 |
| 3,923,966 A | | 12/1975 | Vaughan ................ 423/573 |
| 4,448,951 A | | 5/1984 | Rupert et al. ............ 528/129 |
| 4,637,867 A | * | 1/1987 | Herbst, Jr. ............ 204/157.52 |
| 4,793,980 A | * | 12/1988 | Torobin ................ 423/213.5 |
| 5,282,896 A | * | 2/1994 | Tsuchida et al. ......... 106/411 |
| 5,804,329 A | | 9/1998 | Amendola ............... 429/34 |
| 6,387,843 B1 | | 5/2002 | Yagi et al. ............... 502/328 |
| 6,468,694 B1 | | 10/2002 | Amendola ............ 429/218.1 |
| 6,534,033 B1 | | 3/2003 | Amendola et al. ...... 423/648.1 |
| 6,554,877 B2 | | 4/2003 | Finkelshtain et al. ......... 44/436 |

* cited by examiner

*Primary Examiner*—Jessica L Ward
*Assistant Examiner*—Nicholas P D'Aniello
(74) *Attorney, Agent, or Firm*—Brian S. Steinberger; Joyce Morlin; Law Offices of Brian S. Steinberger, P.A.

(57) ABSTRACT

Organic pigments are capable of catalyzing the decomposition reaction of hydrogen-rich, stabilized, borohydride solutions to generate hydrogen gas on-board an operable hydrogen-consuming device such as a motor vehicle or other combustion engine. The organic pigments are used in hydrogen generating systems and in methods for controlling the generation of hydrogen gas from metal hydride solutions.

4 Claims, 5 Drawing Sheets

CATALYSTS FOR THE EVOLUTION OF HYDROGEN FROM BOROHYDRIDE SOLUTION

This invention claims the benefit of priority from U.S. Provisional Application Ser. No. 60/535,293 filed Jan. 9, 2004, and was supported in part by the National Aeronautical and Space Administration (NASA), grant #NAG3-2751 and Department of Energy, Office of Energy Efficiency and Renewable Energy (EERE), contract #DEFC3699G010449 to University of Central Florida, Florida Solar Energy Center.

FIELD OF THE INVENTION

This invention relates to the novel use of organic pigments as catalysts, in particular to a catalytically controlled system for the release of hydrogen from a hydrogen-rich borohydride solution.

BACKGROUND AND PRIOR ART

Hydrogen gas is a very desirable fuel because it can be reacted with oxygen in hydrogen-consuming devices, such as a fuel cell, combustion engine or gas turbine, to produce energy and water. The use of hydrogen gas can ameliorate environmental pollution; lessen the world's dependency on fossil fuels or petroleum; ease fears of depleted energy sources.

Safe and efficient storage of hydrogen is a prerequisite for widespread commercial use as a fuel. U.S. Pat. No. 6,534,033 B1 to Amendola et al., discloses the use of stabilized metal hydride solutions as an example of a safe, hydrogen-rich storage medium. Thus, with an abundant supply of metal hydride solutions, research is focused on the release of hydrogen from the storage medium.

The class of metal hydrides known as borohydrides is known to decompose in water, in the following manner: borohydride plus water yields metaborate and hydrogen gas. The chemical reaction illustrated with borohydride is:

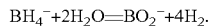
$$BH_4^- + 2H_2O = BO_2^- + 4H_2.$$

Hydrogen-rich borohydrides are also of interest in electroconversion cells where the alkali metal-containing compound, such as borohydride is oxidized to generate electricity (U.S. Pat. No. 5,804,329 to Amendola; U.S. Pat. No. 6,468,694 B1 to Amendola; and U.S. Pat. No. 6,554,877 B2 to Finkelshtain et al.). Although oxidation reactions are required to generate electric current, the spontaneous release of hydrogen gas when borohydrides are in contact with water is reported in each of the patents cited above. The borohydride decomposition reaction in water occurs very slowly without a catalyst. Thus, catalysts become the critical component in any hydrogen gas delivery system based on borohydride decomposition.

Catalysts used in hydrogen gas evolution or production of hydrogen compounds have been identified as amines (U.S. Pat. No. 3,923,966 to Vaughan); metal derivative catalysts (U.S. Pat. No. 4,448,951 to Rupert et al. and U.S. Pat. No. 6,387,843 B1 to Yagi et al.); and transition metal catalysts (U.S. Pat. No. 5,804,329 to Amendola and U.S. Pat. No. 6,534,033 B1 to Amendola et al.).

There is a need for a broader range of catalytic materials, so that there are more choices for use in hydrogen-consuming devices. The present invention provides consumers with a broader choice of catalysts, which, in some cases, catalyze the hydrogen gas evolution reaction at a rate exceeding that of catalysts identified in the prior art.

SUMMARY OF THE INVENTION

The first objective of the present invention is to provide a broader selection of catalysts for the evolution of hydrogen gas from borohydride solutions.

The second objective of the present invention is to provide a hydrogen generation system using a low-cost, safe, stable hydrogen-rich borohydride solution in conjunction with novel organic pigment catalysts.

The third objective of the present invention is to provide a hydrogen gas generation system suitable for on-board generation of hydrogen for hydrogen-consuming devices.

The fourth objective of the present invention is to provide a hydrogen gas generation system suitable for vehicular operation.

The fifth objective of this invention is to provide a novel use for readily available and known organic pigments.

A preferred hydrogen generation system is provided with a metal hydride solution, comprising a metal hydride, a stabilizing agent to provide a pH of approximately 9 or greater and water which is then contacted with organic pigments as hydrogen generating catalysts.

The preferred metal hydride in the hydrogen generating system of the present invention is selected from the group consisting of sodium borohydride, lithium borohydride, potassium borohydride, ammonium borohydride, tetramethyl ammonium borohydride, and mixtures thereof.

The preferred stabilizing agent in the hydrogen generating system of the present invention is selected from the group consisting of sodium hydroxide, lithium hydroxide, potassium hydroxide, ammonium hydroxide, and mixtures thereof.

The preferred organic pigment catalysts are in the form of a solid, loose powder, more preferably the organic pigment is attached to a substrate made of ceramics, cements, glass, zeolites, perovskites, fibers, fibrous material, mesh, polymeric resin and plastic.

The more preferred hydrogen generating catalysts of the present invention are organic pigments having an orbital structure with a low unoccupied molecular orbital (lumo) energy and can be chosen from pyranthrenedione, indanthrene gold orange, ditridecyl-3,4,9,10-perylenetetracarboxylic diimide, indanthrene black, dimethoxy violanthrone, 1,4-diketopyrrolo-3,4C pyrrole, quinacridone, indanthrene yellow, copper phthalocyanine, 3,4,9,10-perylenetetracarboxylic dianhydride, isoviolanthrone, perylenetetracarboxylic diimide, indigo and mixtures thereof.

The preferred hydrogen generating catalysts are formed by blending the catalyst powder with a poly (methyl methacrylate) binder and fixing the blended material onto a plastic substrate.

It is preferred that the hydrogen generating system of the present invention be operably connected to a hydrogen-consuming device that uses a substantial portion of the hydrogen gas reaction product. The hydrogen-consuming device can be a fuel cell, a combustion engine, a gas turbine, and combinations thereof.

A preferred method for controlling the generation of hydrogen gas from a metal hydride solution with organic pigment catalysts includes stabilizing the metal hydride in an aqueous solution, maintaining the temperature of the solution above the freezing point and below the vaporization point of said solution, immersing a catalyst in the metal hydride solution, increasing the rate of decomposition of the metal hydride into hydrogen gas and a metal salt, and directing the hydrogen gas to an operably connected, hydrogen-consuming device, such as a fuel cell, a combustion engine, a gas turbine, and combinations thereof.

The metal hydride used in the hydrogen generating process can be sodium borohydride, lithium borohydride, potassium borohydride, ammonium borohydride, tetramethyl ammonium borohydride, and mixtures thereof.

The hydrogen generating process uses a stabilizing agent such as, sodium hydroxide, ammonium hydroxide, lithium hydroxide, potassium hydroxide, and mixtures thereof to adjust the pH of the metal hydride solution and organic pigment catalysts that have an orbital structure identified by a low unoccupied molecular orbital (lumo) energy. More specifically, the organic pigment catalysts include, but are not limited to, pyranthrenedione, indanthrene gold orange, ditridecyl-3,4,9,10-perylenetetracarboxylic diimide, indanthrene black, dimethoxy violanthrone, 1,4-diketopyrrolo-3, 4C pyrrole, quinacridone, indanthrene yellow, copper phthalocyanine, 3,4,9,10-perylenetetracarboxylic dianhydride, isoviolanthrone, perylenetetracarboxylic diimide, and indigo.

It was surprising and unexpected that organic pigments could be immersed in borohydride solutions in a manner that controls the rate of hydrogen gas evolution suitable for onboard generation of hydrogen for vehicular applications, such as hydrogen fuel cells or combustion engines.

Further objects and advantages of this invention will be apparent from the following detailed description of a presently preferred embodiment that is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The present invention provides a novel use of organic pigments as catalysts in a hydrogen generation system utilizing stabilized borohydride solutions.

Table I is a ranking of catalysts from the fastest to the slowest for the decomposition of sodium borohydride (NaBH$_4$) in a buffered solution of pH 11. Table 1 shows that pyranthrenedione is first with a mean evolution rate of 6.5 ml of hydrogen gas per minute.

TABLE 1

Ranking of Catalysts

| RANK | CATALYST |
| --- | --- |
| 1 | Pyranthrenedione |
| 2 | Indanthrene Gold Orange |
| 3 | Ditridecyl-3,4,9,10-perylenetetracarboxylic diimide 95% |
| 4 | Cobalt Powder (Prior Art) |
| 5 | Indanthrene Black |
| 6 | Dimethoxy Violanthrone |

TABLE 1-continued

Ranking of Catalysts

| RANK | CATALYST |
| --- | --- |
| 7 | 1,4-Diketo-pyrrolo(3,4 C)pyrrole |
| 8 | Quinacridone |
| 9 | Indanthrene Yellow |
| 10 | Copper Phthalocyanine |
| 11 | 3,4,9,10-Perylenetetracarboxylic dianhydride |
| 12 | Isoviolanthrone |
| 13 | Perylenetetracarboxyic diimide |
| 14 | Indigo |

Figure 1:
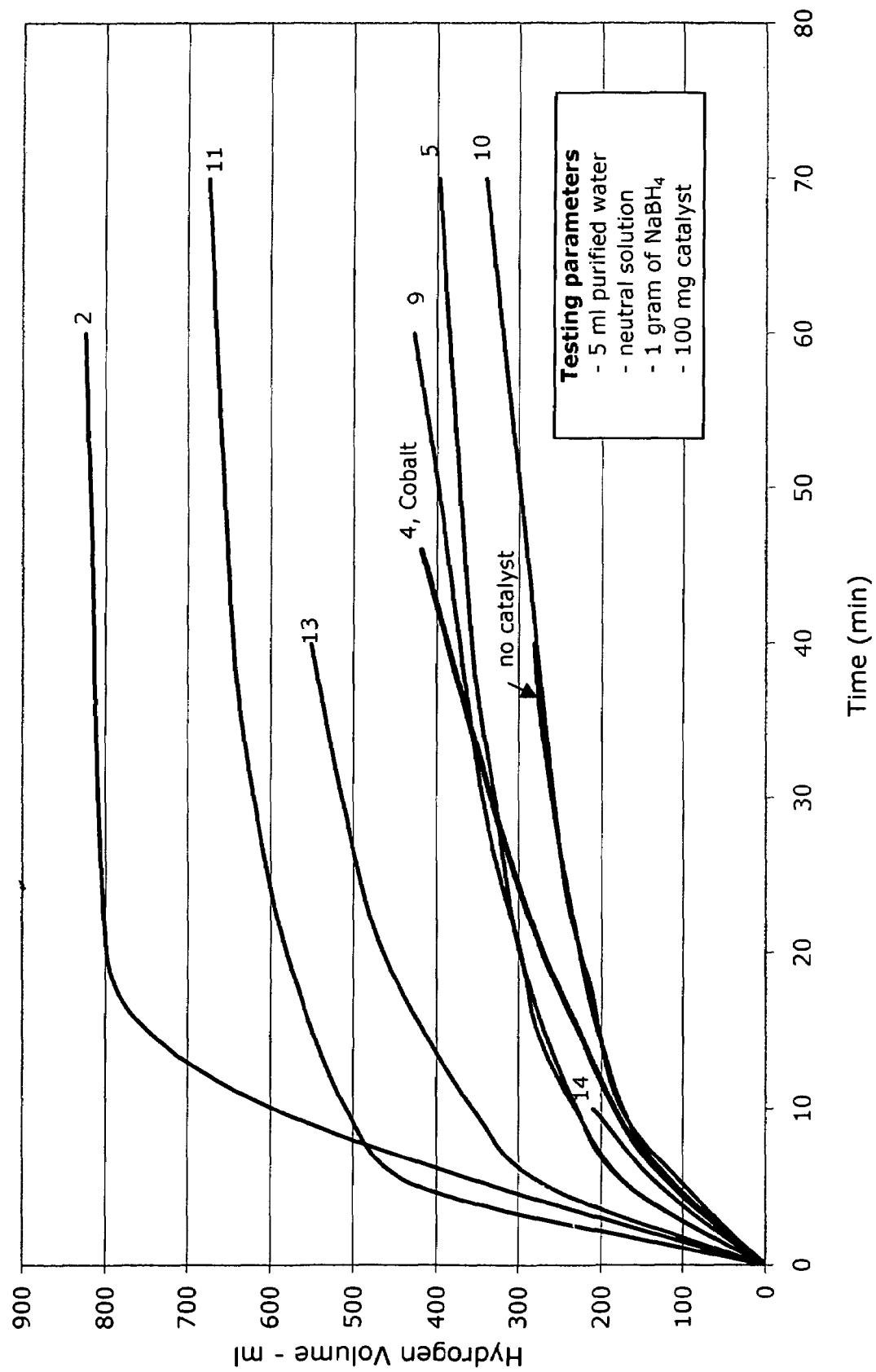
FIG. 1 shows hydrogen gas evolution from non-buffered 0.1 M NaBH$_4$ solution in the presence of many catalysts.

FIG. 1 shows hydrogen generation from an unbuffered aqueous borohydride solution using organic pigments as catalysts. In FIG. 1, the evolution of hydrogen gas is plotted for many different catalysts, including cobalt, a catalyst known in the prior art. Five milliliters (ml) of purified water is adjusted to have neutral alkalinity (pH 7) prior to the addition of one gram of sodium borohydride (NaBH$_4$) in the presence of 100 milligrams (mg) of a catalyst, in the form of a loose powder, selected from the catalysts shown in Table 1. The identity of each catalyst in FIG. 1 corresponds to the numerical ranking in Table 1, which ranks catalytic activity in a buffered solution (pH 11).

The pigment catalyst powder is added to water, and then followed by the addition of solid sodium borohydride. The vessel is immediately sealed except for a thin tube leading to an inverted graduated cylinder for gas measurement. It is seen that after an initial quick rise in H$_2$ volume, the curves tend to level out after about ten minutes. This is due to the depletion of the borohydride content of the vessel as it decomposes, and due to rising pH, which adversely affects the H$_2$ evolution rate. Thus, it is noted that the non-buffered, variably alkaline solution used in FIG. 1 affects the rate at which each catalyst influences hydrogen generation. In the non-buffered 0.1 M NaBH$_4$ solution, indanthrene gold orange (No. 2) catalyzes the generation of 800 ml of hydrogen in approximately ten minutes and can sustain the 800 ml volume of hydrogen gas generation for a period of at least sixty minutes. The organic pigment catalyst, 3,4,9,10-Perylenetetracarboxylic dianhydride, also known as perylene TCDA (No. 11), catalyzes the generation of 500 ml of hydrogen in approximately ten minutes and the volume of hydrogen generated, increases to approximately 700 ml over a period of 60 minutes. Likewise, pigment catalyst (No. 3), Ditridecyl-3,4,9,10-Perylenetetracarboxylicdiimide 95% (also known as perylene diimide) outperforms cobalt, a prior art catalyst and the remainder of catalysts in Table 1.

An equal amount (100 mg) of metallic cobalt powder was employed to serve as a basis of comparison with the existing art in borohydride decomposition catalysts.

Figure 2:
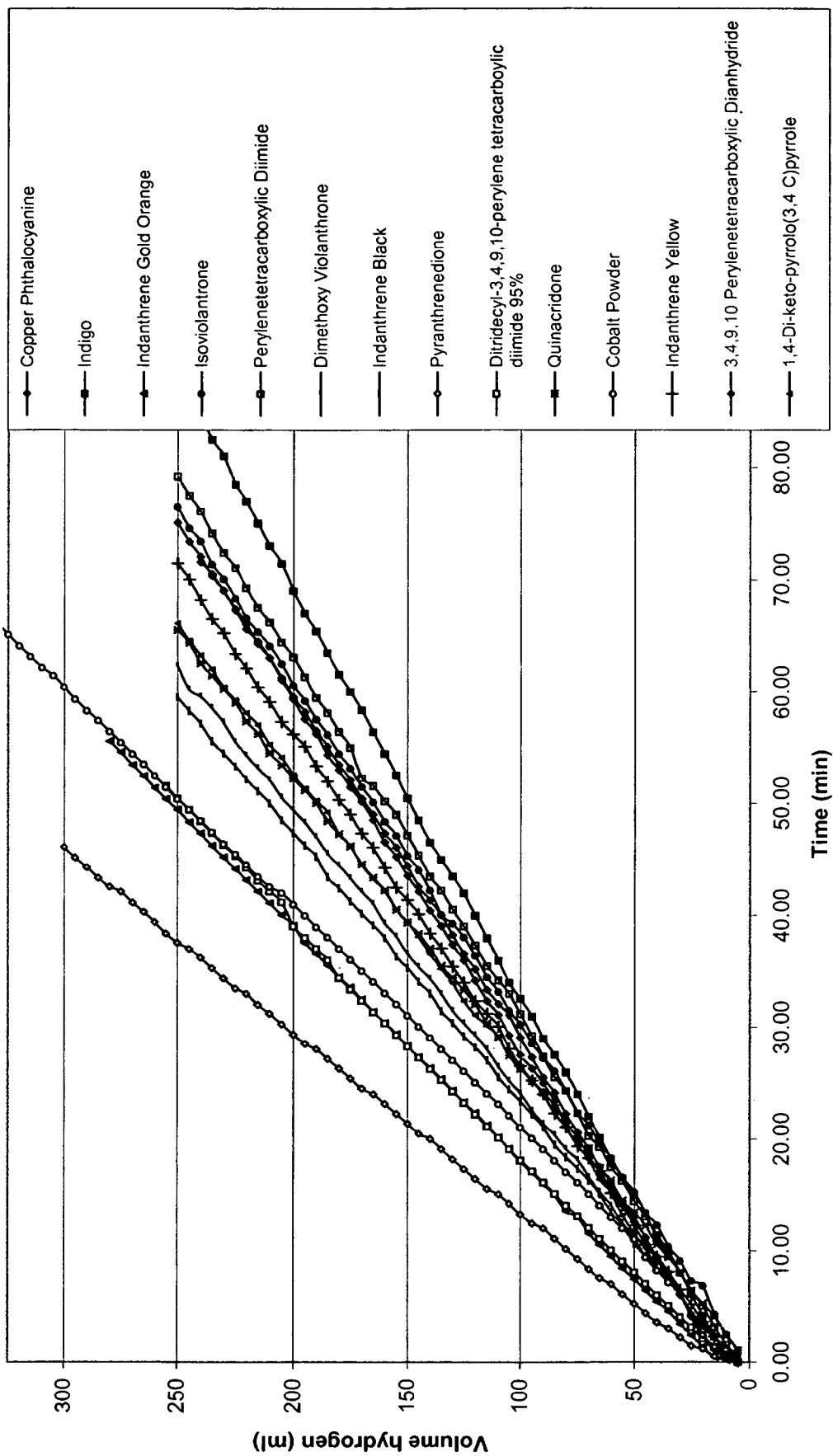
FIG. 2 shows hydrogen gas evolution from 0.1 M NaBH$_4$ solution buffered at pH 11 in the presence of many catalysts.

FIG. 2 shows the rate of hydrogen production with organic pigment catalysts using sodium borohydride in a buffered solution with pH 11. Each catalyst is identified by the unique legend shown on the left of the graph. When buffered solutions are used for borohydride decomposition, the free hydrogen ion concentration remains constant, and so H$_2$ evolves at a constant rate. At pH 11, the evolution rate is slow enough that it can be readily monitored. The order of activity is basically the same for all catalysts, except for pyranthrenedione (also known as pyranthrone), which is the most active catalyst. When plotting the volume of hydrogen generated over a period of time, the graph reveals that 300 ml of hydrogen are generated in approximately 20 minutes by the organic pigment catalyst, pyranthrenedione. The remaining catalysts perform at a slower rate, generating a lower volume of hydrogen, in a range of approximately 250 ml in a time period from approximately 30 minutes to approximately 80 minutes. Cobalt powder, a prior art catalyst, generated approximately 350 ml of hydrogen in approximately 40 minutes. Thus, it is seen that a buffered solution gives a different result for each catalyst used for generating hydrogen. A comparison of the results in FIGS. 1 and 2 shows that the rate of hydrogen evolution during the decomposition of alkali metal borohydride solutions is a function of several factors, including the choice of organic pigment catalyst, the pH of the aqueous solution, and concentration of catalyst.

Figure 3:
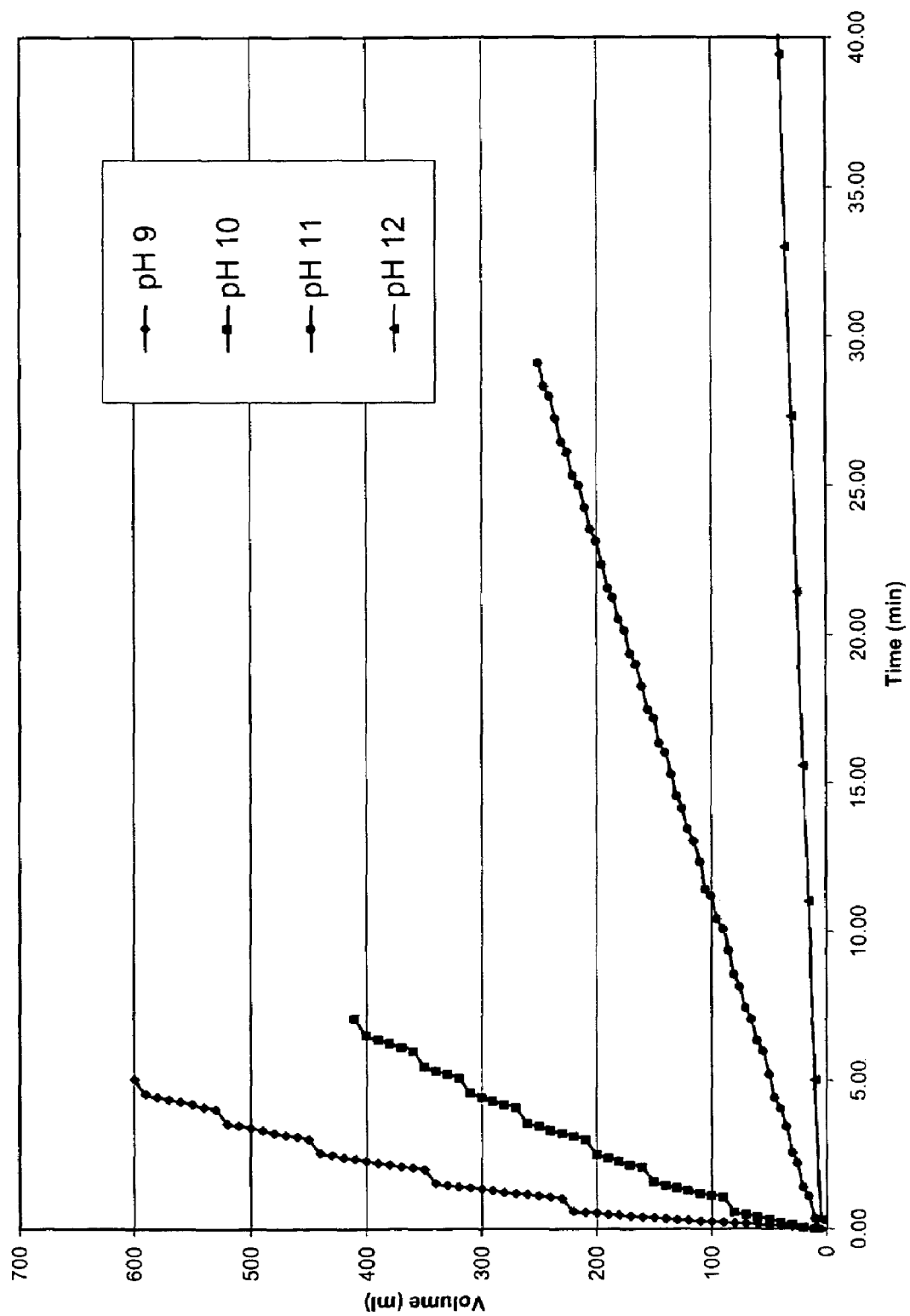
FIG. 3 shows pH dependence of catalytic hydrogen gas evolution from 0.1 M NaBH$_4$ solution using pyranthrenedione catalyst.

FIG. 3 compares the rates of hydrogen production using sodium borohydride and pyranthrenedione in buffered solutions in a range from pH 9 to pH 12. Using the same catalyst, the hydrogen gas evolution at pH 9 is about 600 ml in less than 5 minutes, at pH 10, 400 ml of hydrogen are evolved in approximately 6 minutes; at pH 11 it takes approximately 30 minutes to generate 250 ml hydrogen and at pH 12 the hydrogen evolved is less than 50 ml in over 40 minutes. FIG. 3 graphically illustrates how changing only the pH can be used with an organic pigment catalyst to control rate of hydrogen evolution. The pH is a measure of free hydrogen ion (hydronium ion) concentration in the solution. A first order dependence of gas evolution rate with pH is observed. There is an inverse relationship between pH and the free hydrogen ion concentration. Therefore, as pH increases, the $H_2$ evolution rate decreased, as shown in FIG. 3. Each unit increase in pH translates to an order of magnitude decrease in hydrogen ion concentration. Consequently, the slope of the gas evolution curve decreased by nearly an order of magnitude with each unit increases of pH.

Figure 4:
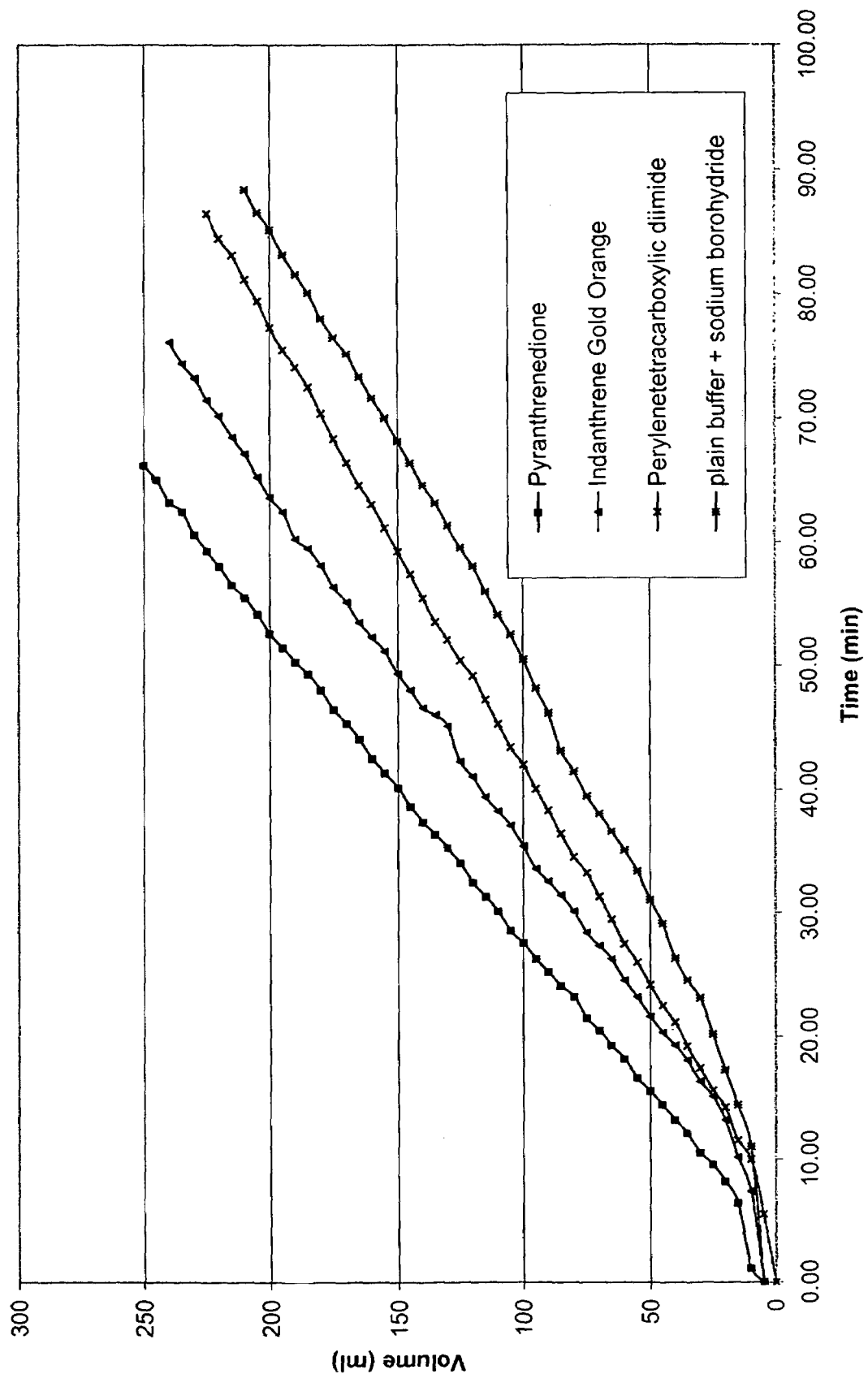
FIG. 4 shows the evolution of hydrogen gas from NaBH$_4$ solution at pH 11 over immobilized organic pigment catalysts.

FIG. 4 shows the varying rates of hydrogen gas evolution from sodium borohydride ($NaBH_4$) solution catalyzed by organic pigments immobilized on polycarbonate substrates and buffered to a pH 11. A plain polycarbonate strip and select group of organic pigment catalyst powders, are individually blended with a poly(methyl methacrylate) binder and fixed onto a plastic substrate. The resulting gas evolution curves for the organic pigment catalysts show that the immobilized catalyst powders are still active for hydrogen evolution. After approximately 1 hour immobilized pyranthrenedione generates 250 ml of hydrogen gas; indanthrene gold orange immobilized on a substrate generates approximately 240 ml of hydrogen gas in 75 minutes and immobilized perylenetetracarboxylic diimide 95% catalyzes the evolution of hydrogen at a slightly slower rate, 225 ml in approximately 80 minutes. FIG. 4 provides a further example of how the organic pigment catalysts can be used to control the rate of $H_2$ evolution. Immobilization of the selected catalysts did not change the activity ranking for the same catalysts in loose powder form.

Figure 5:
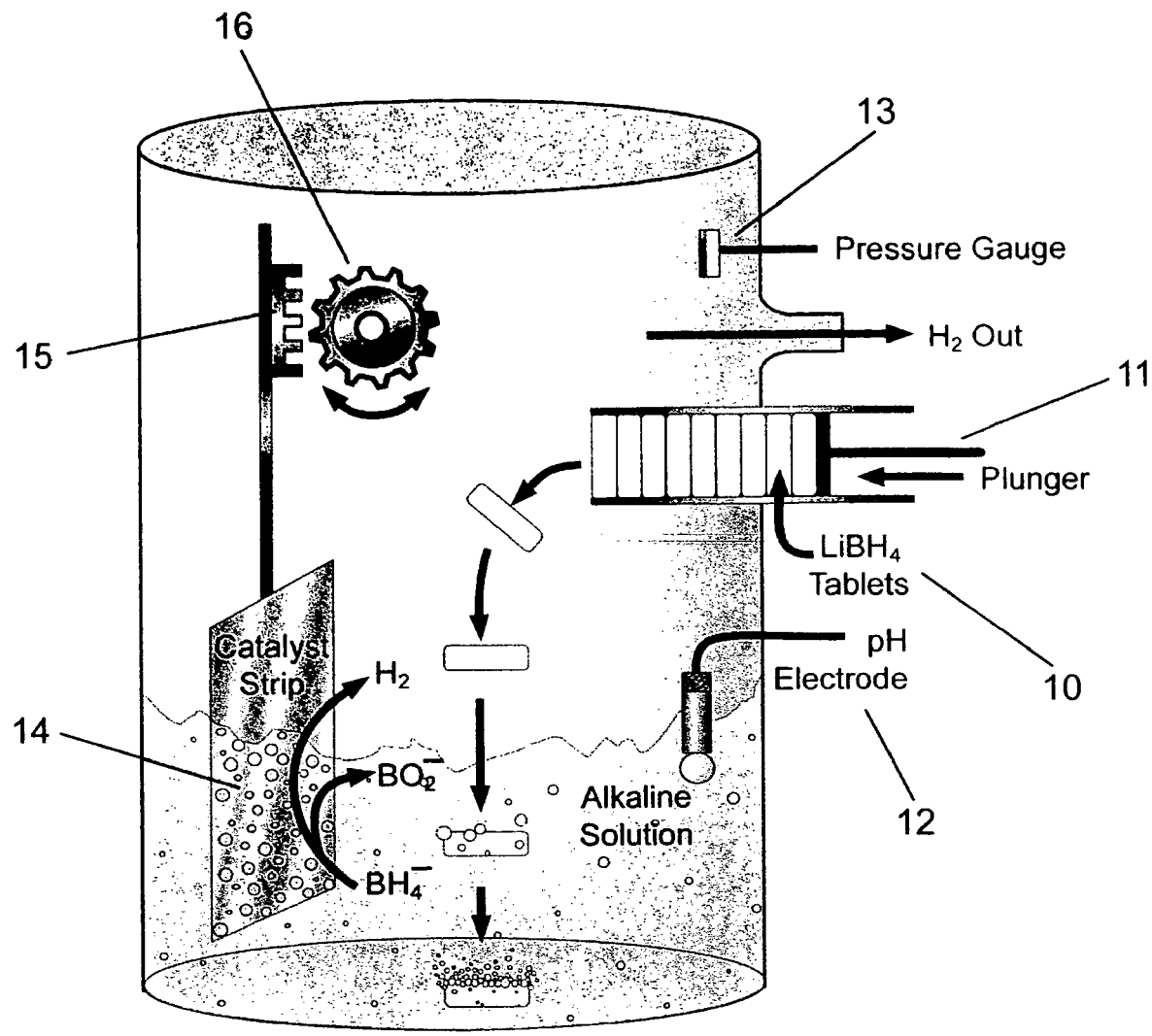
FIG. 5 is a schematic view of a hydrogen gas generation device using LiBH$_4$ tablets.

The importance of the use of an immobilized catalyst is shown in the design of a hydrogen supply system based on lithium borohydride and shown in FIG. 5. A prototype hydrogen supply system is shown in FIG. 5. Tablets of compressed borohydride powder, 10 are loaded into a horizontal canister equipped with a spring-loaded plunger 11. A pH electrode 12, pressure gauge 13, or other sensor detects the state of $H_2$ evolution. A catalyst strip 14 is immersed in the alkaline solution receiving the lithium borohydride tablets 10 that dissolve in the alkaline solution and in the presence of the catalyst strip 14 decompose into $BH_4^-$ ions and $BO_2^-$ ions with the release of hydrogen gas ($H_2$). The equation for the catalyzed reaction is $BH_4^- + 2H_2O \rightarrow BO_2^- + 4H_2$. Alternatively, the throttle of a hydrogen fueled vehicle could be coupled to the plunger to control the rate of mixing. The pH and temperature of the solution can be controlled so that the background rate of $H_2$ evolution in the absence of catalyst can be minimized.

As learned from FIG. 4, an immobilized catalyst 14, is fastened onto the end of an armature 15, which is manipulated by a gear wheel 16, or other adjustment mechanism so that the immersion depth of the catalyst 14 into the borohydride solution can be varied at will. During high fuel consumption modes, such as highway driving or acceleration in general, the catalyst strip can be lowered further into the borohydride solution to expand the total area that is performing the gas-evolving borohydride decomposition reaction.

There are many advantages to the present organic pigment catalysts, including, but not limited to, increased utilization of known materials, versatility, reliability, accuracy of hydrogen release and economy in material consumption and fuel production.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An organic pigment catalyst-controlled hydrogen generation system, comprising:

a borohydride solution, consisting of only four components;

a hydrogen-rich borohydride selected from the group consisting of sodium borohydride, lithium borohydride, potassium borohydride, ammonium borohydride, tetramethyl ammonium borohydride, and mixtures thereof combined with water and a stabilizing agent selected from at least one of sodium hydroxide, lithium hydroxide, potassium hydroxide, ammonium hydroxide, and mixtures thereof to provide a pH of 9 or greater; and a catalyst strip consisting of an organic pigment selected from the group consisting of pyranthrenedione, indanthrene gold orange ditridecyl-3,4,9,10-perylenetetracarboxylic diimide, indanthrene black, dimethoxy violanthrone, 1,4-diketopyrrolo-3,4C pyrrole, quinacridone, indanthrene yellow, 3,4,9,10-perylenetetracarboxylic dianhydride, isoviolanthrone, and perylenetetracarboxylic diimide, in the form of a solid, loose powder immobilized on a substrate selected from the group consisting of ceramics, cements, glass, zeolites, perovskites, fibers, fibrous material, mesh, polymeric resin and plastic, wherein the catalyst strip is manipulated so that an immersion depth of the catalyst into the borohydride solution is varied to expand the total area that is performing the hydrogen gas-evolving borohydride decomposition reaction represented by the equation, $BH_4^- + 2H_2O \rightarrow BO_2^- + 4H_2$, where the only four components of the borohydride solution are the hydrogen-rich borohydride, the water, the stabilizing agent, and the organic pigment catalyst strip.

2. The hydrogen generation system of claim 1, wherein the solid, loose catalyst powder is blended with a poly (methyl methacrylate) (PMMA) binder and the blended material is fixed onto the PMMA plastic substrate.

3. The hydrogen generation system of claim 1, wherein a hydrogen-consuming device uses a substantial portion of the hydrogen gas reaction product, said device being operably connected with said system.

4. The hydrogen generation system of claim 3, wherein the hydrogen-consuming device is selected from the group consisting of a fuel cell, a combustion engine, a gas turbine, and combinations thereof.

* * * * *